United States Patent
Voris et al.

(10) Patent No.: US 9,914,262 B2
(45) Date of Patent: Mar. 13, 2018

(54) PRINT METHOD USING A THREE DIMENSIONAL (3D) PRINTER TO PROVIDE SCANNING PROTECTION FOR PRINTED 3D OBJECTS

(71) Applicant: DISNEY ENTERPRISES, INC., Burbank, CA (US)

(72) Inventors: Jeffrey Voris, Pasadena, CA (US); David W. Crawford, Long Beach, CA (US); Jorge Alted, Altadena, CA (US); Benjamin Foster Christen, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/432,013

(22) Filed: Feb. 14, 2017

(65) Prior Publication Data
US 2017/0151715 A1 Jun. 1, 2017

Related U.S. Application Data

(62) Division of application No. 14/334,156, filed on Jul. 17, 2014.

(51) Int. Cl.
*B29C 67/00* (2017.01)
*D01F 6/62* (2006.01)
(Continued)

(52) U.S. Cl.
CPC .......... *B29C 64/118* (2017.08); *B29C 64/106* (2017.08); *B29C 64/386* (2017.08);
(Continued)

(58) Field of Classification Search
CPC ... B29C 64/118; B29C 64/386; B29C 64/106; B33Y 50/02; B33Y 70/00; B33Y 10/00;
(Continued)

(56) References Cited

U.S. PATENT DOCUMENTS

| 2014/0117585 A1 | 5/2014 | Douglas et al. |
| 2015/0099025 A1 | 4/2015 | Spalt |
| 2016/0016360 A1 | 1/2016 | Voris et al. |

FOREIGN PATENT DOCUMENTS

| GB | 1183483 A | 3/1970 |
| JP | 108519 A | 4/1990 |

OTHER PUBLICATIONS

CN Office Action for Chinese Patent Application No. 201510391213.6, dated Mar. 10, 2017.

*Primary Examiner* — Robert J Grun
(74) *Attorney, Agent, or Firm* — Marsh Fischmann & Breyfogle LLP; Kent A. Lembke

(57) ABSTRACT

A print method for printing three dimensional (3D) objects that are difficult to copy by use of a 3D scanner and 3D printer. The printer includes a print head with an extrusion nozzle with a heated portion and a print bed with a surface for receiving material extruded from the extrusion nozzle. The printer includes a print material supply spool loaded with an anti-scanning filament. The method includes operating the print head to draw the anti-scanning filament into the heated portion for heating and to extrude the heated filament from the extrusion nozzle to form a 3D object. The printed 3D object includes one or more scan protected exterior surfaces on at least one element of the 3D object. The scan protected exterior surfaces are either light absorbing or reflect light in unconventional directions. The anti-scanning filament is a plastic mixed with an anti-scanning additive such as a retroreflective material.

20 Claims, 6 Drawing Sheets

(51) Int. Cl.
*D01F 6/28* (2006.01)
*B29C 64/118* (2017.01)
*B33Y 10/00* (2015.01)
*B33Y 70/00* (2015.01)
*D01F 1/10* (2006.01)
*B33Y 50/02* (2015.01)
*B29C 64/106* (2017.01)
*B29C 64/386* (2017.01)
B33Y 30/00 (2015.01)
B29K 55/02 (2006.01)
B33Y 50/00 (2015.01)

(52) U.S. Cl.
CPC ............... *B33Y 10/00* (2014.12); *B33Y 50/02* (2014.12); *B33Y 70/00* (2014.12); *D01F 1/106* (2013.01); *D01F 6/28* (2013.01); *D01F 6/625* (2013.01); *B29K 2055/02* (2013.01); *B29K 2995/003* (2013.01); *B33Y 30/00* (2014.12); *B33Y 50/00* (2014.12)

(58) Field of Classification Search
CPC ......... B33Y 50/00; B33Y 30/00; D01F 1/106; D01F 6/625; D01F 6/28; B29K 2995/003; B29K 2055/02
See application file for complete search history.

PRINT METHOD USING A THREE DIMENSIONAL (3D) PRINTER TO PROVIDE SCANNING PROTECTION FOR PRINTED 3D OBJECTS

CROSS REFERENCE TO RELATED APPLICATIONS

This application is a divisional of U.S. patent application Ser. No. 14/334,156, filed Jul. 17, 2014, which is incorporated herein by reference in its entirety.

BACKGROUND

1. Field of the Description

The present invention relates, in general, to fabrication of three dimensional (3D) objects, and, more particularly, to a filament-based 3D printer and corresponding printing materials (e.g., filaments) specially configured and operable to print 3D objects that are configured to provide protection against 3D scanning (e.g., to prevent full or effective scanning of the objects printed with a 3D printer).

2. Relevant Background 3D printing is an additive technology in which objects (or "printed 3D objects") are created from a digital file. The digital file may be generated from software such as a computer aided design (CAD) program or another 3D modeling program or with a 3D scanner to copy an existing object that provides input to a 3D modeling program. To prepare the digital file for printing, software, provided on a printer-interfacing computer or running on the 3D printer itself, slices the 3D model into hundreds to thousands of horizontal layers. Typically, only the outer wall or "shell" is printed to be solid such that a shell thickness may be defined as part of modifying the 3D model for use in printing, and, during printing, the shell is printed as a solid element while the interior portions of the 3D object are printed in a honeycomb or other infill design (e.g., to reduce the amount of material that has to be printed to provide the printed 3D object).

When the prepared digital file of the 3D object is uploaded into the 3D printer, the 3D printer creates the object layer-by-layer. The 3D printer reads every slice (or 2D image) from the 3D model and proceeds to create the 3D object by laying down (or printing) successive layers of material until the entire object is created. Each of these layers can be seen as a thinly sliced horizontal cross section of the eventually completed or printed 3D object.

One of the more common 3D printer technologies uses fused deposition modeling (FDM) or, more generally, fused filament fabrication (FFF). FDM printers work by using a plastic filament (e.g., acrylonitrile butadiene styrene (ABS) or polylactic acid (PLA) provided as strands of filament that is 1 to 3 millimeters in diameter) that is unwound from a coil or spool mounted onto the printer housing. The plastic filament is used to supply material to a print head with an extrusion nozzle, e.g., a gear pulls the filament off the spool and into the extrusion nozzle. The extrusion nozzle is adapted to turn its flow on and off. The extrusion nozzle (or an upstream portion of the print head) is heated to melt the plastic filament as it is passed into, or through, the extrusion nozzle so that it liquefies. The pointed extrusion nozzle deposits the liquefied material in ultra fine lines (e.g., in lines that are about 0.1 millimeters across).

The extrusion head and its outlet are moved in both horizontal and vertical directions to complete or print each layer of the 3D model by a numerically controlled mechanism that is operated or controlled by control software running on the 3D printer (e.g., a computer-aided manufacturing (CAM) software package adapted for use with the 3D printer). The extruded melted or liquefied material quickly solidifies to form a layer (and to seal together layers of the 3D object), and the extrusion nozzle is then moved vertically prior to starting printing of the next layer. This process is repeated until all layers of the 3D object have been printed.

As mentioned above, a 3D object that has been printed on a 3D printer or otherwise fabricated is relatively easy to copy through the use of 3D scanner and a 3D printer using the files created by the 3D scanner. There are many commercially-available scanners that can reproduce a digital model that may be used as the digital file used to control printing by a 3D printer. As a result, a person with a 3D printer may copy nearly any 3D object even without access to the digital file originally used by a manufacturer in creating the "original" 3D object, and it can be difficult for a company distributing collectables and other 3D objects, such as plastic figurines of movie and animated film characters, to prevent unlicensed copying. This can be an even larger problem for companies that want to protect products that are made through a 3D printing process. These products or items are often designed to be well suited for fabricating using 3D printers such as through the design of their exterior surfaces, but the 3D objects may have unique features or have associated intellectual property features that the companies wish to protect by limiting copying.

Hence, there remains a need for new 3D printers or printing methods that make it difficult to copy a 3D object, such as one printed with a 3D printer. Preferably, such 3D printers and printing methods would be adapted to be relatively inexpensive to implement and would be useful with existing and future 3D printer technologies such as with fused deposition modeling (FDM) or fused filament fabrication (FFF) technologies.

SUMMARY

Briefly, a 3D printer, and filament material for such a printer, is described that is adapted for printing 3D objects with integral protection against 3D scanning. The 3D printer is configured to use a new material as filament as the supply material, rather than a conventional plastic filament as in prior 3D printers, for use in forming the entire 3D object or all or a portion of the outer shell of the 3D object (e.g., the outermost 10 percent of each layer may be printed using the new filament or new supply material). In some embodiments, the new filament is fabricated to include an anti-scanner additive, with the fraction of such an additive varying to implement the filament such as in the range of 2 to 25 percent or more of the additive to a plastic filament (base or starting material for new filament).

The anti-scanner additive is chosen to either absorb a greater amount of light than the filament's base/starting material or to disruptively reflect a greater amount of light than the filament's base/starting material, as 3D objects having an outer layer or shell with such materials are difficult to accurately model using a 3D scanner (which relies on predictable reflection from surfaces of a 3D object to accurately model an object) and, hence, are more difficult to copy using a 3D printer. In this regard, one exemplary anti-reflective additive is a retroreflective material, and the 3D printer of the present description uses a plastic filament with an embedded retroreflective (or the filament is formed from retroreflective plastic) to print 3D objects that are more difficult to accurately scan with a 3D scanner. One objective of using the additive or filler is to prevent scanner light that is projected on the object from reaching the scanner's sensor. This can be accomplished by absorbing the light so that it does not bounce back to the sensor or by reflecting the light away from the sensor. A retroreflective material is good for the latter option because while the position of the 3D scanner's sensor may vary it does not coincide with the position of the 3D scanner's light source.

As with prior filaments, the filament with an anti-scanner additive is pulled into a print head and liquefied by a heater (in the head or in the extrusion nozzle) prior to extrusion from the extrusion nozzle to form or "print" each layer of the 3D object. The filament with the anti-scanner additive may be used for the entire outer layer(s) or shell or for one or more subsets/portions of the outer layer(s) or shell to achieve scanning protection. For example, the 3D object may be a figurine of a character from a movie or animated film, and the new filament material may be used to form the face or head of the figurine to effectively block useful scanning of the face/head to limit copying of the object printed by the 3D printer.

More particularly, a printer is provided that is adapted for printing three dimensional (3D) objects that are difficult to copy by use of a 3D scanner to provide a model of the 3D object. The printer includes a print head with an extrusion nozzle with a heated portion and a print bed with a surface for receiving material extruded from the extrusion nozzle. Significantly, the printer also includes a print material supply spool loaded with an anti-scanning filament. The print head is adapted for drawing the anti-scanning filament into the heated portion for heating prior to extrusion from the extrusion nozzle to form a 3D object. Further, the 3D object includes one or more scan protected exterior surfaces on at least one element of the 3D object.

The scan protected exterior surfaces are either light absorbing surfaces (e.g., absorb 20 percent or more light than surfaces formed form conventional plastic filament) or surfaces that reflect light in one or more unconventional directions (e.g., back to a light source rather than at a conventional reflection angle away from the light source). In some embodiments of the printer, the anti-scanning filament is a plastic (e.g., an ABS or PLA starter or base material) mixed with an anti-scanning additive. The anti-scanning additive may include a quantity of a retroreflective material, with some embodiments using a quantity that is in the range of 2 to 25 percent of the material of the anti-scanning filament while others use a quantity that is in the range of 5 to 10 percent.

The printer may include a controller positioning and operating the print head based on a 3D object model defining a plurality of print layers for the 3D object including the scan protected exterior surfaces. The controller prints the scan projected exterior surfaces with the anti-scanning filament and prints other portions of the 3D object using an additional print material supply spool loaded with a plastic filament free of an anti-scanning additive. In some cases, the printer (or its system) may include a printer interface system for receiving user input and processing the user input to designate the scan protected surfaces.

According to another aspect of the description, a filament is described for use with 3D printers to provide scanning protection. The filament includes base material that is a plastic, and the filament also includes an anti-scanning additive, mixed into the plastic base material, that increases light absorption by the plastic or that modifies reflectivity of the plastic. In some embodiments, the base material is acrylonitrile butadiene styrene (ABS) or polylactic acid (PLA) providing at least about 75 percent by volume of the filament. The anti-scanning additive may be a retroreflective material (e.g., a plurality of retroreflector beads or the like), and the retroreflective material may make up or be provided so as to be at least 5 percent by volume of the filament while in the same or other cases the retroreflective material makes up less than about 25 percent by volume of the filament.

DETAILED DESCRIPTION

Figure 1:
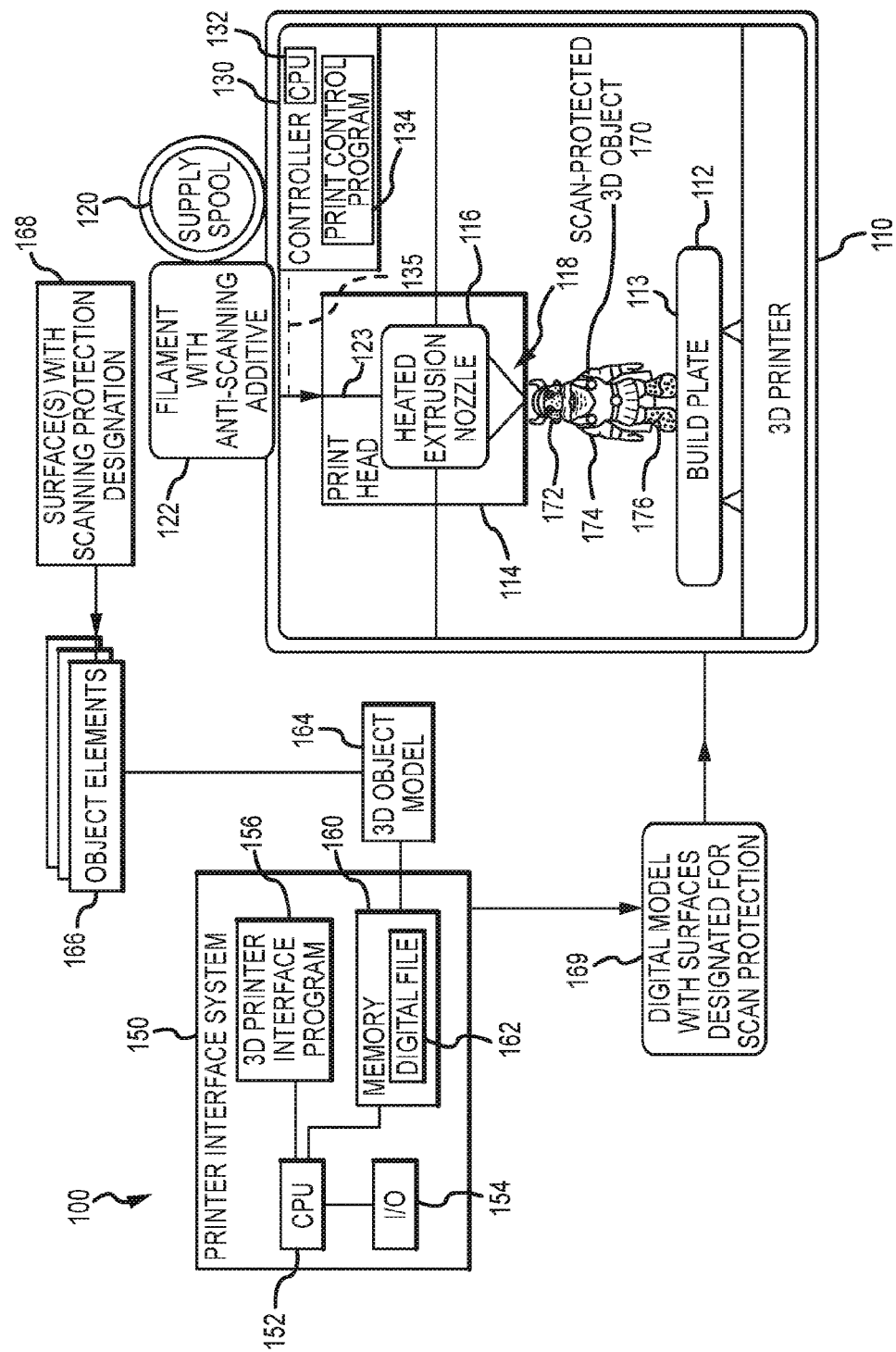
FIG. 1 is a functional block diagram of a 3D printer system during printing operations to provide a scan-protected 3D object with a single print head and a material supply (e.g., a spool loaded with a plastic filament with an anti-scanning additive (or a spool loaded with an anti-scanning filament) that may be used throughout the printing process or be changed out with a spool with conventional plastic filament to print surfaces or object elements without scanning protection)

The inventors recognized that there was a need for technologies that allowed objects ("3D objects) to be printed with 3D printers that would be difficult to copy using a model ("scanner-generated digital file") from a 3D scanner as input for a conventional 3D printer. Further, the inventors recognized that conventional 3D scanners use light sources such as bulbs, LEDs, and lasers, and light from these sources is directed upon the various surfaces of a 3D object (e.g., an object output from a conventional 3D printer). The 3D scanner or its light sensor(s) processes the reflected light from the surfaces of the 3D object to produce a 3D model of the 3D object such as by determining distances from each surface. In brief, most existing 3D scanners rely upon predictable reflection of light off a targeted object, and the inventors determined that copying of a 3D object could be prevented or at least protected (e.g., made more difficult or less accurate) by providing a 3D printer that printed objects with controlled reflection off of one or more of its outer surfaces (or from a portion of its outer surface).

With these understandings in mind, a 3D printer with an anti-scanning filament was designed that can be used to print 3D objects that are difficult to accurately scan using a conventional 3D scanner. Particularly, the anti-scanning filament is used to form all or portions of the outer layer(s) such as the shell of the 3D object or a portion of such outer layer(s) or shell such that the 3D object has at least some areas of its outer surface that provide a predictable and controlled reflection of light away from the 3D scanner's sensor. In one implementation, the anti-scanning filament is acrylonitrile butadiene styrene (ABS) or polylactic acid (PLA) (or other plastic) base or starting material combined with an anti-scanning additive, such as a light absorbing material or a highly reflective material.

Specifically, the additive may be a retroreflective material (or a retroreflector) that directs light striking surfaces printed or formed with the anti-scanning filament away from a scanning sensor (e.g., provide reflection not predicted by the 3D scanner). Upon completion of printing, numerous retroreflective elements would be an integral part of the printed 3D object (or its outer surface/shell) and generally not visible under normal lighting and/or viewing conditions. However, when the 3D object is scanned with a 3D scanner, the retroreflective elements in the material would reflect the scanning light directly back to the light source instead of towards the scanning sensor(s) as predicted and required by the 3D scanner. As a result, the 3D scanner generates a model of the printed 3D object in which the portions of the surface (or shell) of the 3D object with the retroreflective element are incorrectly modeled. For example, no or less light is detected such that portions of the 3D object are not modeled at all or distances are inaccurately estimated such that an imperfect model is produced that is not useful in forming a copy of the 3D object.

FIG. 1 is a functional block diagram of a 3D printer system 100 during printing operations to provide a scan-protected 3D object 170 with a single print head 114 and one or more material supplies. As shown, the system 100 includes a first spool 120 loaded with an anti-scanning filament 122 such as a plastic filament with an anti-scanning additive and may also include or use a second spool (not shown) loaded with conventional colored, plastic filament that may be used to replace supply spool 120 to print surfaces or object elements that are not scan protected. The 3D print system 100 is, thus, configured to allow an operator to print 3D objects having all surfaces of a 3D object 170 scan protected (e.g., formed with filament 122) or one or more of the surfaces of the object 170 have such scan protection using a single print head and one or more supply spools.

As shown, the system 100 includes a 3D printer 110 and a printer interface system 150. The printer interface system 150 may be a desktop computer, a workstation, a laptop or pad computer, or other computer device operable by a user of the 3D printer 110 to select and transmit a digital model 169 that includes one or more surfaces designated for scan protection (i.e., for printing using filament 122 on spool 120) to the 3D printer 110 for use in printing a 3D object 170. To this end, the printer interface system 150 includes a processor or central processing unit (CPU) 152 that operates or manages input and output (I/O) devices 154 such as a monitor, a touchscreen, a mouse, a keyboard, speakers, voice recognition devices, and the like that allow an operator or user of the system 150 to provide user input.

Particularly, the printer interface system 150 may include memory devices or data storage components (e.g., computer readable medium) 160 (or have access to such memory devices) that are managed by the processor 152 to store one or more digital files 162 that are used to print a 3D object 170. Also, the system 150 may use the CPU 152 to execute code or software (in computer readable medium such as RAM, ROM, or the like on the system 150) in the form of a 3D printer interface program 156. The interface program 156 may be downloaded onto the system 150 to allow an operator to interact with the 3D printer 110 and its print controller 130, and the 3D printer 110 may provide this software/program 156 upon a first link of the system 150 and the 3D printer 110 or the software/program 156 may be downloaded separately (e.g., by inserting a CD into the system 150, by accessing a web site associated with the 3D printer 110, or the like).

In practice, the 3D printer interface program 156 may be adapted to cause a series of interface screens to be presented by the system 150 and the I/O devices 154 to a user. The user may select a 3D object for printing by first generating a 3D model 164 of a 3D object, and this definition may also include setting a thickness for an outer shell of object 170 and a structural infill (e.g., one or more honeycomb patterns).

Significantly, the 3D object model 164 may include a plurality of object elements or portions 166, and an operator may apply a scanning protection designation to one or more of these objects 166 or to all or portions of their surfaces as shown at 168. For example, as shown in FIG. 1, a 3D object 170 (e.g., a figurine of a Viking) is printed with the 3D printer using the filament 122 along with a conventional filament. An operator has designated (as shown at 168) that the head 172 (a first object element) and the legs 176 (a second object element) should be formed to prevent or limit scanning by a 3D scanner. Hence, when the 3D printer 110 operates to print the object 170, it is controlled by controller 130 to print at least the outer surface/layer of the head 172 and legs 176 using the filament 122 with the anti-scanning additive on supply spool 120 and to form the body 174 with filament from a second spool (e.g., conventional plastic filament without an anti-scanning additive). In other cases, though, the entire object 170 may be printed using the filament 122 such that all surfaces of the object 170 limit effective scanning (e.g., via controlled reflections and/or via light absorption surfaces/materials).

The printer interface program 156 may be adapted to provide a listing of object elements or surfaces 166 available for anti-scanning designation 168 with a particular 3D printer 110 while some embodiments may configure the print control program 134 to process a designation 168 to automatically select the object elements/surfaces 166 for scanning protection. In yet other embodiments, the 3D printer interface program 156 (or scanning protection module of this or a separate program) may receive the 3D object model 164 and randomly or otherwise select one or more of the object elements 166 or all or portions of their surfaces for designation 168 as a scan-protected element/surface. Then, during operations, the printer interface system 150 is operable to communicate (wirelessly or in a wired manner) with the 3D printer 110 including transmitting a full color digital model 169 (or sending the digital file 162 to the 3D printer) to the 3D printer 110 for use by the print control program 134 to print a scan-protected 3D object 170 (in other cases, the print control program 134 accesses the digital file 162 in the memory 160, as needed for printing, rather than transmitting the model 169 to the 3D printer).

The 3D printer 110 includes a build plate or print bed 112 with an upper or exposed surface 113 upon which melted plastic (with the anti-scanning additive) is printed from a print head 114 to form a scan-protected 3D object 170. This can be seen in FIG. 1 with the 3D object 170 having differing elements or surfaces 172, 174, 176, and each may be printed with a filament 122 with an anti-scanning additive from supply spool 120 (or just the shell portion of each object element/portion 172, 174, 176 may be printed with the filament 122 with the inner portions formed with conventional plastic filament as this portion is not exposed to light during scanning by a 3D scanner). To this end, the 3D printer 110 includes a print head 114 with a heated extrusion nozzle 116 with a pointed tip/outlet 118 from which liquid plastic (including the anti-scanning additive) is ejected or extruded to build up the object 170 layer-by-layer. In some cases, the heated extrusion nozzle 116 may include a heater or heat coil about a tube while in other cases a melting/heating chamber is provided immediately upstream of the tip/outlet 118.

Further, the 3D printer 110 includes a print material supply in the form of a supply spool 120 upon which is wrapped or wound a length of plastic designed to prevent or limit 3D scanning. Particularly, the plastic is provided as a filament 122, with an anti-scanning additive, that can be drawn as shown by arrow 123 into the extrusion nozzle 116 where it is melted or liquefied by a heater. For example, the filament 122 may take the form of ABS, PLA, or other plastic useful in 3D printing to which a volume of an additive or material that increases light absorption or that changes the reflection in a manner that hinders sensing of reflected light by a 3D scanner. For example, reflection can be altered by adding a quantity of retroflective material or retroreflectors (e.g., a retroreflective plastic) to ABS, PLA, or other plastic. A "retroreflector" is any material that reflects light back to its source with a minimum of scattering (e.g., materials/elements (e.g., small beads or the like) configured as corner reflectors, as Cat's eye reflectors, or as phase-conjugate mirrors). The quantity of the additive may be several percent up to 10 to 25 percent to achieve the desired alteration of reflection in object elements or surfaces printed using the anti-scanning filament 122.

The 3D printer 110 includes a controller 130 for interfacing with the printer interface system 150 so as to print the scan-protected 3D object 170 based on the digital file 162. The controller 130 includes a processor 132 executing or running software/code in the form of a print control program 134 (e.g., code in computer readable media accessible by the CPU 132). The print control program 134 is configured to selectively cause the filament 122 to be drawn (e.g., with gearing or the like) 123 from the spool 120 into the head 114. The print control program 134 recognizes scanning protection designations 168 in the 3D object model 164 and uses this recognized information to select the spool 120 with filament 122 (or indicate that a conventional filament-filled spool be changed out or replaced with spool 120) such as when only portions 172, 176 are scan protected in the printed 3D object 170 while other portions 174 are printed using conventional filament(s). The print control program 134 also operates to move the print head 114 within a layer and to a new layer to print the 3D object 170 (e.g., to provide 3D printing, layer-by-layer as is known by those skilled in the art of 3D printing). In each layer of the 3D object 170, the outer layer(s) or surfaces of the plastic may include the anti-scanning additive or the entire layer may be formed using the filament 122 to provide plastic with the anti-scanning additive.

Figure 2:
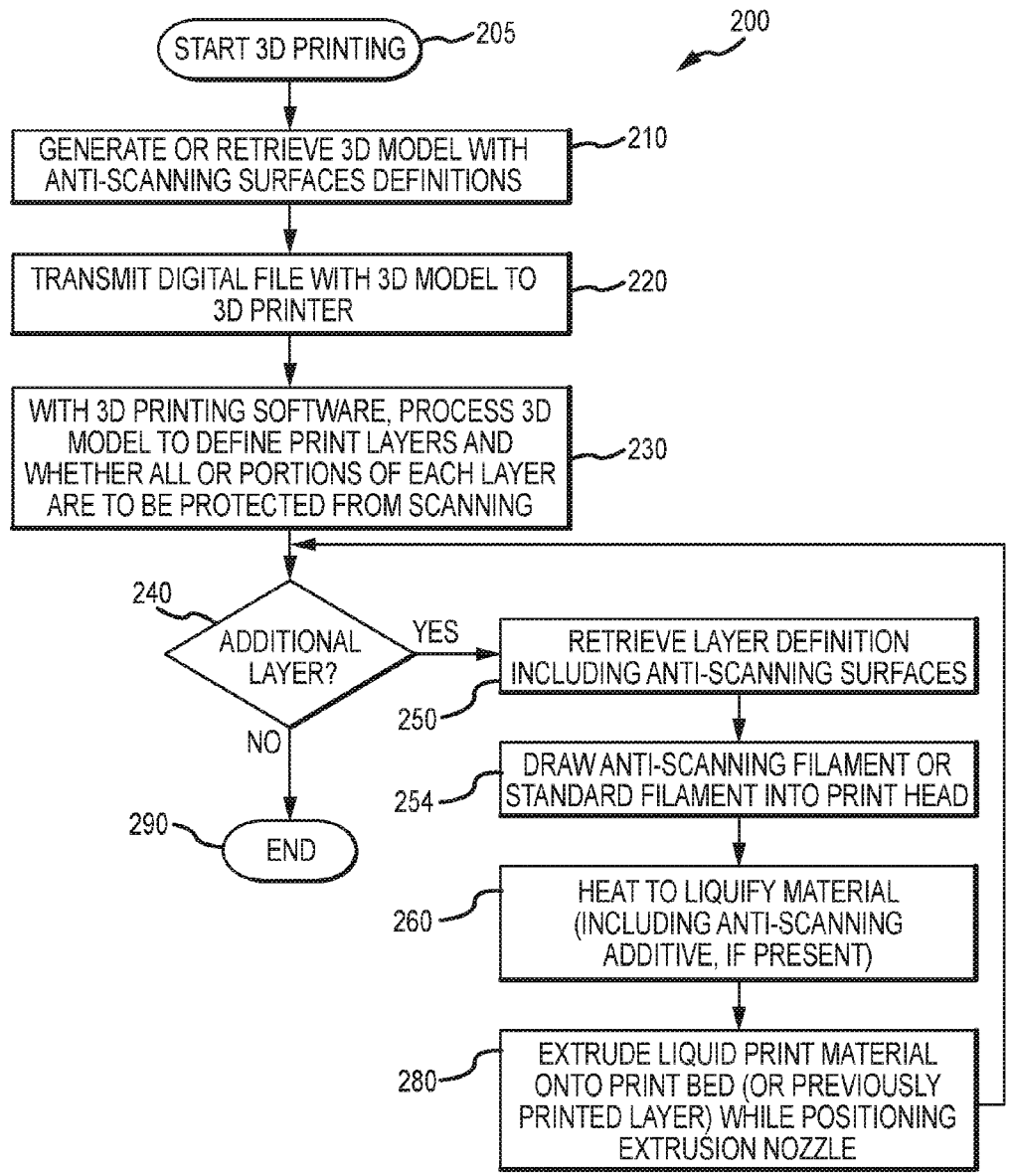
FIG. 2 is a flow diagram for a method of fabricating or printing a multi-colored 3D object using a filament-based 3D printer such as with use of the system of FIG. 1.
Figure 3:
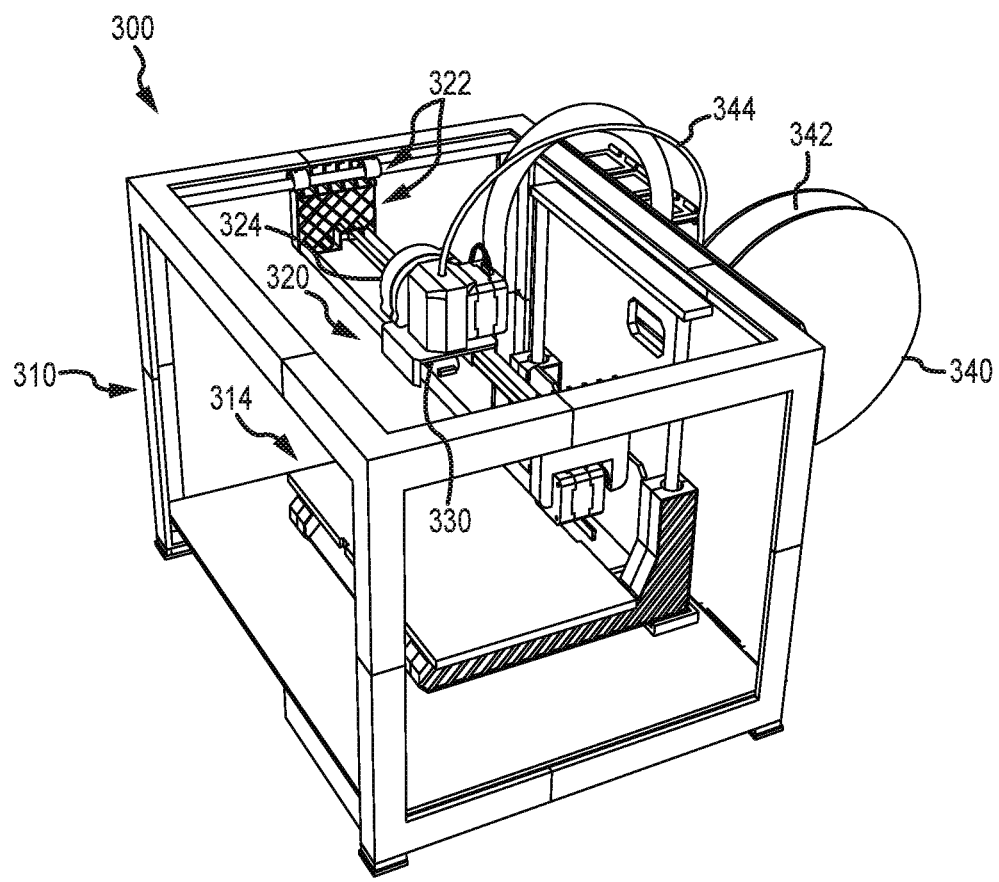
FIG. 3 illustrates a perspective top bottom view of a 3D printer of one useful design according to the present description.

FIG. 2 illustrates a 3D printing method 200 that may be performed according to the present description such as by operation of the system 100 of FIG. 1 or the 3D printer shown in FIG. 3. The method 200 starts at 205 such as with communicatively linking a printer interface system/computer with a 3D printer, with loading a print material onto a feed spool (e.g., a plastic filament without or with an anti-scanning additive), and with providing 3D printer-to-user device interface software on a user's printer interface system/computer. In some cases, the 3D printer also has to be allowed time to warm up including heating an extrusion nozzle to a temperature within a useful plastic liquefying/melting range.

The method 200 continues at 210 with generating a 3D model of an object or retrieving/selecting a previously generated 3D model. The 3D model includes a mapping of scan protected surfaces onto at least the shell or exterior layer(s) of the 3D object or scanning protection designations for each object element or exterior surface of the modeled 3D object. The method 200 continues at 220 with transmitting the digital file with the 3D model to a 3D printer configured for multi-colored printing as taught herein (or the controller of the 3D printer may access a memory device storing the digital file as needed in step 220 and during printing with such transmittal).

In step 230, the method 200 continues with the 3D printer control or printing software functioning to process the 3D model of the object. This processing includes defining print layers or thin slices of the 3D model of the object for use in printing a 3D object. In step 230, the 3D printing software identifies or recognizes the designation for use of anti-scanning filament or standard filament (for different layers or within a single layer) to all of the object or portions of the object and may include assigning use of anti-scanning filament to only the shell portion (or other surfaces/outer layers) of each print layer to limit the amount of anti-scanning additive used for 3D printing (e.g., to control material costs in some cases).

The method 200 continues at 240 with determining (e.g., with the printing software running on the 3D printer) whether there are additional layers to be printed. If so, the method 200 continues at 250 with retrieving the next layer definition including scanning protection designations for all or a portion of the next print layer. At 254, the method 200 continues with drawing additional amounts of the print material (plastic filament with or without anti-scanning additive depending on the definitions retrieved at 250) into the print head such as by operating an electric motor to turn gears engaging the filament. At 260, the method 200 continues with heating the print material such as ABS plastic with retroreflectors or other anti-scanning additive to liquefy at least the ABS plastic or base/starter material for the anti-scanning filament (e.g., in some implementations, the retroreflector or other additive does not melt but has a small enough size (e.g., very small metal beads) that it can pass through a printer's extrusion nozzle without clogging).

At step 280, the method 200 includes extruding the now liquid print material (with, at least for a portion of the printing 200, the anti-scanning additive) onto the print bed or previously-printed layer while positioning the extrusion nozzle relative to the print bed to print the current object layer. Once a layer is completed, the method 200 continues at 240 with determining whether or not more layers need to be printed. In some cases, the print material may be changed during printing of a layer such as to print an outer shell with anti-reflective material, and the method 200 may include halting printing and prompting an operator to switch supply spools (to or from a spool containing a filament with an anti-scanning additive). If more layers need to be printed at 240, the method 200 involves raising the extrusion nozzle vertically away from the print bed to a new layer height/vertical position and repeating steps 250-280. If not, the method 200 ends at 290 such as with moving the print head away from the printed 3D object, turning the nozzle heater off, and indicating printing is completed (e.g., through a user interface on a printer interface computer system).

While the specific implementation of the 3D printer may vary to practice the invention, it may be useful to provide one exemplary configuration for a 3D printer that may operate to print scan-protected 3D objects with a single print head and with a single print material supply (which may be switched out if it is desired to also print layers or portions of layers with plastic filament without an anti-scanning additive). FIG. 3 illustrates a top perspective view of a 3D printer 300 useful for printing scan-protected 3D objects. The 3D printer 300 includes a frame or a housing 310 upon which is mounted a print bed or platform 314, which may be heated so as to minimize curling of the plastic during cooling/printing (e.g., for use with ABS plastic). The 3D printer includes a print head assembly 320 with a print head 324 and with a mounting and positioning assembly 322. The 3D printer 300 may include a motherboard for receiving 3D model data from a computer via a USB or similar communications port for a memory card/device and for sending this data to controllers.

Specifically, the 3D printer 300 may include drive motors to control motion of the print head 324 with assembly 322 (or by movement of the build platform 314 in some alternative embodiments). For example, a Z-axis motor may be provided to raise and lower the print head 324 in the vertical direction relative to the upper surface of the build platform 314 and also include X-axis and Y-axis motors to move the print head 324 side-to-side and front-to-back relative to the build platform 314 and previously printed layers of a 3D object on the platform 314. Stepper motor controllers may be included to translate commands from the controller on the motherboard into pulses to precisely move the stepper motors and accurately position the print head 324. The printer head 324 includes a heater on a chamber or extrusion end 330 along with a print nozzle 334.

Print material is provided with a spool 340 mounted onto the frame 310 to be able to spin or rotate, and a length or amount of an anti-scanning filament 342 (e.g., a filament formed from an ABS or other plastic base or starter material that is mixed with a quantity of an anti-scanning additive such as a plurality of retroreflectors) is wound onto the spool. The print head assembly 320 may include a stepper motor to draw in the anti-scanning filament 342 into a tube 344 upstream of the outlet/nozzle 334, and the heater or end of the extrusion end 330 may heat the drawn or fed in filament 342 to a predefined temperature range to liquefy or melt it (and, in some cases, the anti-scanning additive while in other cases the anti-scanning material such as retroflective material/retroreflectors are not melted). For example, a cartridge may be used to apply heat to a metal core that melts the filament 342, and the core may be wrapped in insulation. The melted plastic is then pushed through the nozzle 334 in a thin stream so as to build up the 3D object on the build platform 314 in layers (e.g., each layer may be about 0.3 millimeters thick).

Figure 4:
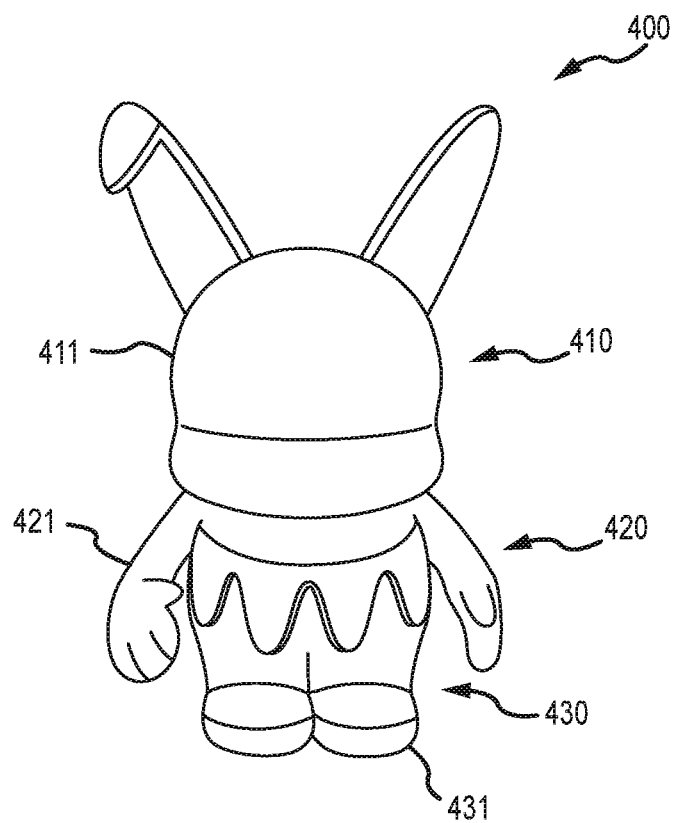
FIG. 4 illustrates a 3D object that is printed first using conventional or standard plastic filament without an anti-scanning additive and second using standard plastic filament for portions of the object and an anti-scanning additive for other portions.
Figure 5:
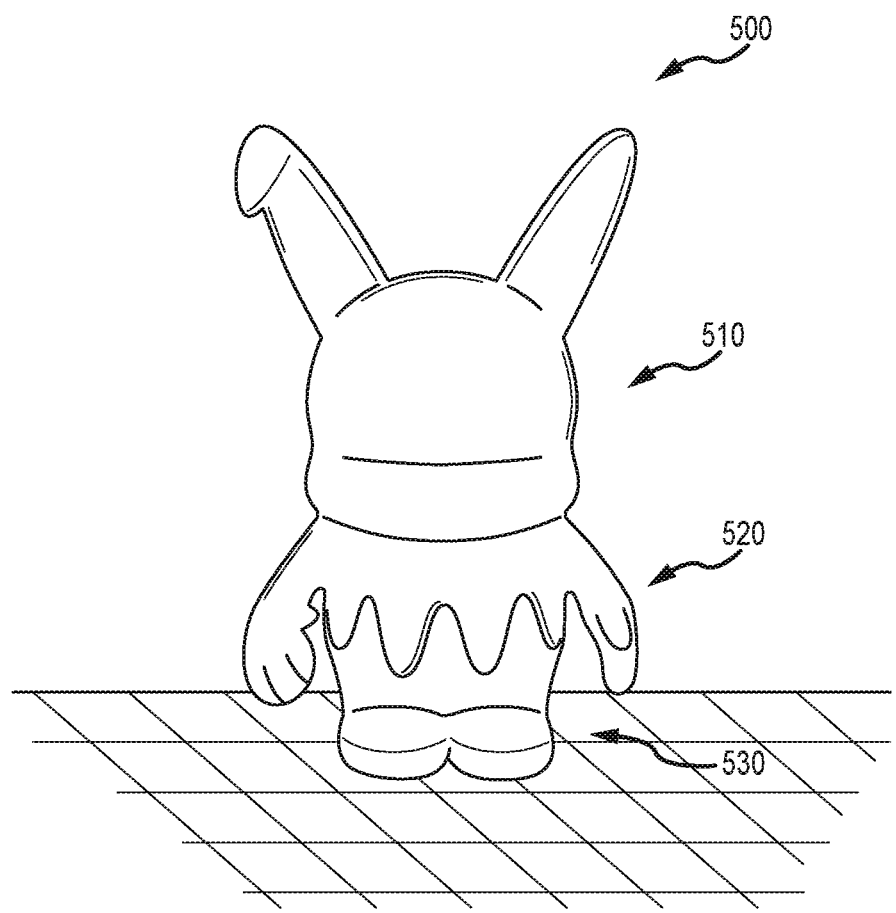
FIG. 5 illustrates an output of a 3D scanner operated to scan the 3D object of FIG. 4 when standard plastic filament is used for printing.
Figure 6:
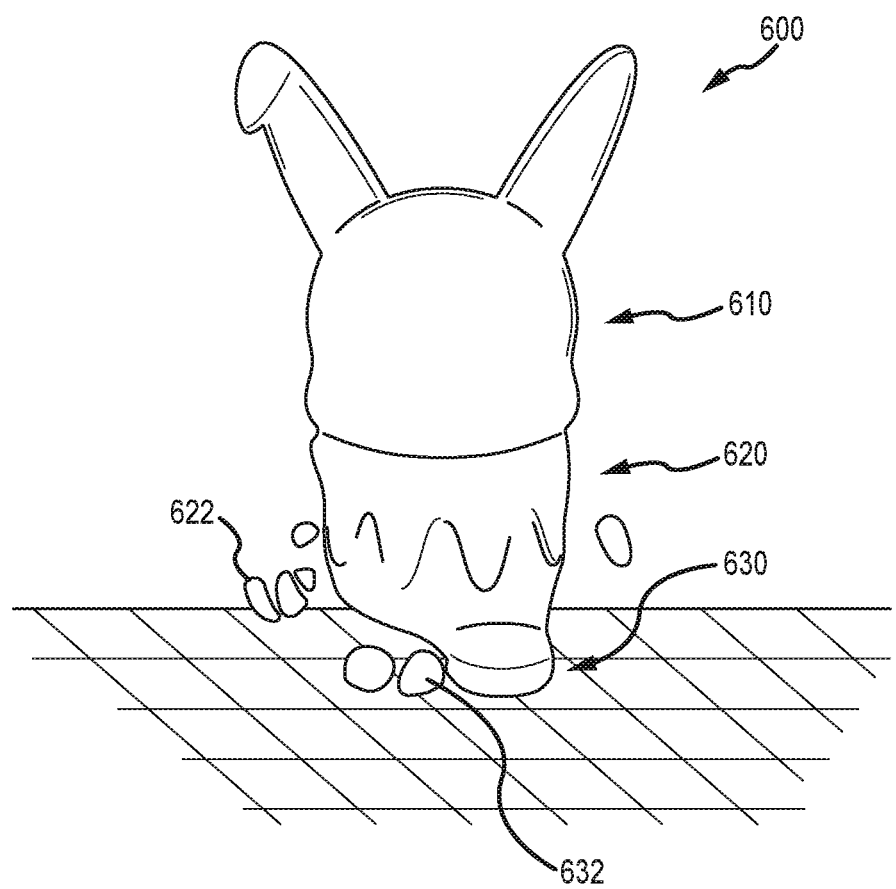
FIG. 6 illustrates an output of the same 3D scanner operated to scan the 3D object of FIG. 4 when anti-scanning filament is used for printing portions (or surfaces) of the object.

FIG. 4 illustrates a 3D object 400 that can be printed using conventional or standard plastic filament without an anti-scanning additive (e.g., as a conventional 3D object that is susceptible to copying using a 3D scanner) and then using standard plastic filament for portions of the object and an anti-scanning additive for other portions. Then, the 3D object 400 printed in these two ways can be scanned with a 3D scanner with results as shown in FIGS. 5 and 6, respectively.

As shown in FIG. 4, the 3D object 400 is a figurine of an animated character or an animal with a head 410, a body 420 (torso and arms), and a lower body 430 (legs and feet which may be covered by footwear). To fabricate the 3D object 400, a first printing run may be performed using a digital 3D model defining the shape and size of the 3D object 400 and its object elements/portions 410, 420, 430 (e.g., outer shell and inner features that may be honeycombed, solid, or another configuration) and their outer or exposed surfaces 411, 421, 431. Such a first printing run may involve a 3D printer using a supply spool filled with plastic filament that is free or substantially free of an anti-scanning additive (as described and defined herein). Also to fabricate the 3D object 400, a second printing run may be performed using the same 3D model and the same (or a different) 3D printer.

The second printing may involve operating a 3D printer with the 3D model and using a supply spool filled with plastic filament that includes an anti-scanning additive such as a light absorbing additive or a disruptively-reflective additive (e.g., a material that does not provide standard reflection from surfaces with such a material such as a retroreflective material or plurality of retroreflectors). This spool may be used to print the lower body or object element 430 (or at least outer surface/shell 431) and the body or object element 420 (or at least the outer surface/shell 421), and a spool with conventional filament may be used to print the head, infill, or object element 410 (including the outer surface/shell 411) (or other embodiments may provide this portion 410 also with the anti-scanning filament).

In this manner, the outer surfaces (or the shells) 411, 421, 431 of object 400 in the first printing run provide conventional or predictable reflection of light. In contrast, the outer surfaces (or the shells) 421 and 431 of the object elements/portions 420 (torso or body) and 430 (lower body or legs and feet) provided from the second printing run provide more controlled reflection that can reduce and even ruin the effectiveness of 3D scanning, which relies on predictable light reflection from outer surfaces of an object to be useful in creating a 3D model of such outer surfaces (e.g., to calculate distances from sensors receiving reflected light to the 3D object's outer surfaces). In this example, the object element/portion 410 (the figurine head) is provided using conventional plastic filament such that its outer surface or the shell 411 provides more predictable reflection of light (e.g., is susceptible to scanning by a 3D scanner).

FIG. 5 illustrates an output 500 of a 3D scanner (not shown) operated to scan the 3D object 400 of FIG. 4 that is was formed with standard plastic filament for 3D printing. Most (if not all) commercially-available 3D scanners operate by reflecting light off of the surfaces of a 3D object and then generating a 3D model of this object. In this regard, output 500 represents the 3D model generated by a 3D scanner by reflecting light of the surfaces 411, 421, 431 of the object elements 410 (head), 420 (body/torso), and 430 (lower body or legs and feet). As can be seen in FIG. 5, the 3D scanner's output or model 500 provides a relatively accurate reproduction of each of the object elements as shown at 510, 520, 530, e.g., object element 510 is similar in size and shape as element 410, element 520 is similar in size and shape as element 420, and element 530 is similar in size and shape as element 430. As a result, the output/3D model, with or without additional processing and surface manipulations, can be readily used to generate a 3D model file for a 3D printer, which facilitates ready copying of the 3D object 400 when it is fabricated wholly using a conventional plastic filament.

FIG. 6 illustrates an output/3D model 600 of the same 3D scanner operated to scan the 3D object 400 of FIG. 4 when anti-scanning filament is used for printing portions 420 and 430 or at least surfaces 421 and 431 of the 3D object 400 and when object element (head) 410 is printed using conventional plastic filament. As shown, the scanner output 600 includes a good reproduction of the object element/head 610 that was formed using conventional plastic filament as the surfaces 411 of the object element/head 410 provide good or predictable reflection of light from the 3D scanner that can be captured/received by the scanner's sensors.

However, the scanner output 600 includes a second object element/body (or torso) 620 that is not a good reproduction or duplication of the object's body 420. In fact, one or more features or parts 622 of the object element/body 620 are "floating" or unattached to the rest of the body/object element 620. For example, the arms 622 of the torso 620 are not attached as they are in the body 420 of the scanned 3D object 400. This result is due to the fact that the filament used to print the body/object element 420 included an anti-scanning additive (e.g., a quantity of retroreflectors at least in the exterior surface/shell 421), which caused light directed onto the surfaces 421 to be either absorbed or reflected in a non-conventional manner such that the scanner's light sensors fail to detect an adequate amount of light to properly model the body/object element 420 as shown with modeled body 620 and its floating or unattached/unsupported pieces 622. If the model/output 600 is used to try to generate a 3D printer input file (input 3D model) without a large amount of modification and programming effort, the 3D printer will not be able to print the floating pieces 622 and the body/object element 620 will not provide a good copy of the object element/body 420 of the scanned 3D object 400 as its shape/size significantly differs.

Likewise, the scanner output 600 includes a third object element/lower body (or legs and feet) 630 that is not a good reproduction or duplication of the object's lower body 430. In fact, one or more features or parts 622 of the object element/lower body 630 are "floating" or unattached to the rest of the lower body/object element 630. For example, the legs and/or feet 632 of the lower body 630 are not attached as they are in the lower body 430 of the scanned 3D object 400. This result is due to the fact that the filament used to print the lower body/object element 430 (or at least its exterior surfaces/shell 431) included an anti-scanning additive (e.g., a quantity of retroreflectors at least in the exterior surface/shell 431), which caused light directed onto the surfaces 431 to be either absorbed or reflected in a non-conventional manner such that the scanner's light sensors fail to detect an adequate amount of light to properly model the lower body/object element 430 as shown with modeled body 630 and its floating or unattached/unsupported pieces 632. If the model/output 600 is used to try to generate a 3D printer input file (input 3D model) without a large amount of modification and programming effort, the 3D printer will not be able to print the floating pieces 632 and the lower body/object element 630 will not provide a good copy of the object element/body 430 of the scanned 3D object 400 as its shape/size significantly differs.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The anti-scanning material is preferably selected for its compatibility with the particular plastic (ABS, PTA, or the like) used as the base/starter material for the anti-scanning filament for use with a 3D printer. The 3D printer may be designed to build upon the Fused Filament Fabrication (FFF) method with the input 3D model including defined or designated surfaces or object elements that are to be formed using the anti-scanning filament and, if present, surfaces or object elements that are to be formed using conventional plastic filament.

We claim:

1. A method for printing a scan-protected 3D object, comprising:
   generating or retrieving a digital model of the 3D object;
   processing the digital model to define a plurality of print layers; and
   operating a 3D printer to extrude a liquid plastic with an anti-scanning additive to form at least outer portions of one or more of the print layers.

2. The method of claim 1, wherein the anti-scanning additive increases absorption of light by a surface formed with the liquid plastic.

3. The method of claim 1, wherein the anti-scanning additive modifies reflection of light by a surface formed with the liquid plastic.

4. The method of claim 3, wherein the anti-scanning additive comprises a plurality of retroreflectors.

5. The method of claim 4, wherein the anti-scanning additive makes up at least 5 percent of material extruded from the 3D printer to form the outer portions of the one or more of the print layers.

6. The method of claim 1, further comprising receiving a user input designating a surface of the 3D object for scanning protection and wherein the surface of the 3D object is provide by the one or more print layers formed with the liquid plastic with the anti-scanning additive.

7. The method of claim 1, wherein the operating of the 3D printer comprises drawing a filament into a heated extrusion nozzle to provide a source of the liquid plastic with the anti-scanning additive.

8. An anti-scanning filament for use as a print supply material for a three dimensional (3D) printer for printing 3D objects, comprising:
   a base material; and
   an anti-scanning additive mixed with or embedded in the base material.

9. The anti-scanning filament of claim 8, wherein the base material is a plastic.

10. The anti-scanning filament of claim 9, wherein the base material comprises at least 75 percent by volume of the anti-scanning filament and wherein the plastic is acrylonitrile butadiene styrene (ABS) or polylactic acid (PLA).

11. The anti-scanning filament of claim 8, wherein the anti-scanning additive comprises a retroreflective material.

12. The anti-scanning filament of claim 11, wherein the anti-scanning additive comprises a volume of the anti-scanning filament in the range of 2 to 25 percent.

13. The anti-scanning filament of claim 12, wherein the volume is in the range of 5 to 10 percent.

14. The anti-scanning filament of claim 8, wherein the anti-scanning additive comprises a material that absorbs a greater amount of light than the base material.

15. The anti-scanning filament of claim 8, wherein the anti-scanning additive comprises a material that absorbs a greater amount of light than the base material.

16. An anti-scanning filament for use with a 3D printer for printing 3D objects, comprising:
   a base material; and
   an anti-scanning additive, mixed into the base material, that comprises a retroreflective material.

17. The anti-scanning filament of claim 16, wherein the anti-scanning additive comprises a volume of the anti-scanning filament in the range of 2 to 25 percent.

18. The anti-scanning filament of claim 17, wherein the volume is in the range of 5 to 10 percent.

19. The anti-scanning filament of claim 16, wherein the base material is a plastic and wherein the base material comprises at least 75 percent by volume of the anti-scanning filament.

20. The anti-scanning filament of claim 19, wherein the plastic is acrylonitrile butadiene styrene (ABS) or polylactic acid (PLA).

* * * * *